US006801779B1

(12) United States Patent
Liebenow

(10) Patent No.: US 6,801,779 B1
(45) Date of Patent: Oct. 5, 2004

(54) METHOD AND APPARATUS FOR INTERACTION WITH BROADCAST CONTENT BASED UPON POSITION

(75) Inventor: Frank Liebenow, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 605 days.

(21) Appl. No.: 09/813,578

(22) Filed: Mar. 21, 2001

(51) Int. Cl.[7] .................................................. H04Q 7/20

(52) U.S. Cl. ................................ 455/456.1; 455/67.11; 455/115.11; 342/357.06; 342/357.07

(58) Field of Search ................................ 455/456, 405, 455/414, 99, 456.1, 67.11, 457, 515, 115.1, 115.2, 115.3; 342/357.01, 357.02, 357.06, 357.07, 357.08, 357.09, 357.1, 357.11, 357.12, 357.13, 357.14, 357.15

(56) References Cited

U.S. PATENT DOCUMENTS

| | | | | | |
|---|---|---|---|---|---|
| 4,159,490 | A | | 6/1979 | Wood | 360/12 |
| 5,170,164 | A | | 12/1992 | Lewis | 340/988 |
| 5,565,909 | A | * | 10/1996 | Thibadeau et al. | 725/35 |
| 5,627,547 | A | | 5/1997 | Ramaswamy et al. | 342/357 |
| 5,671,195 | A | | 9/1997 | Lee | 369/7 |
| 5,732,324 | A | | 3/1998 | Rieger, III | 455/3.1 |
| 5,742,893 | A | | 4/1998 | Frank | 455/66 |
| 5,767,795 | A | | 6/1998 | Schaphorst | 340/988 |
| 5,864,753 | A | * | 1/1999 | Morita et al. | 455/186.1 |
| 6,091,816 | A | | 7/2000 | Woo | 380/4 |
| 6,108,602 | A | | 8/2000 | Bairamis | 701/208 |
| 6,177,905 | B1 | | 1/2001 | Welch | 342/357.13 |
| 6,209,026 | B1 | | 3/2001 | Ran et al. | 709/218 |
| 6,577,849 | B1 | * | 6/2003 | Eaton et al. | 455/3.01 |
| 2001/0003847 | A1 | * | 6/2001 | Shimazu | 725/60 |
| 2001/0029550 | A1 | * | 10/2001 | Endo et al. | 709/319 |

FOREIGN PATENT DOCUMENTS

| | | | |
|---|---|---|---|
| WO | WO 01/27790 | A1 | 4/2001 |

* cited by examiner

*Primary Examiner*—Cong Van Tran
(74) *Attorney, Agent, or Firm*—Scott Charles Richardson; Peng Zhu; Suiter-West

(57) ABSTRACT

The present invention is directed to a system and method of interacting with broadcast content based upon position. By providing a method and apparatus suitable for interacting with broadcast content based upon position, a user has a dynamic and flexible way of interacting with broadcast content. A method for determining availability of broadcast content to a broadcast content receiver may include determining position of a broadcast content receiver. The broadcast content receiver is suitable for obtaining broadcast content. A broadcast data is queried by the broadcast content receiver for broadcast transmittal data corresponding to the determined position of the broadcast content receiver. The broadcast database includes broadcast transmittal data including broadcast content access data suitable for enabling the broadcast content receiver to access broadcast content and broadcast location data suitable for enabling the broadcast content receiver to determine location accessibility of the broadcast content from a broadcast transmitter.

44 Claims, 9 Drawing Sheets

METHOD AND APPARATUS FOR INTERACTION WITH BROADCAST CONTENT BASED UPON POSITION

FIELD OF THE INVENTION

The present invention generally relates to the field of providing broadcast content, and particularly to a method and apparatus for interaction with broadcast content based upon position.

BACKGROUND OF THE INVENTION

Broadcast content is one of the most prevalent forms of information dissemination available. Radio stations, television stations, satellite networks, and the like provide a wide range of content in a manner that is widely accessible to users in a cost-effective and pervasive manner. However, with the growth of cities, the increasing mobility of modem society and the increasing number of broadcast content providers, accessing desired broadcast content has become more difficult.

Additionally, a user may wish to access a certain item of content while traveling. However, the range of a broadcast transmitter may not be sufficient to cover the full range of the user's travels. For example, a user in an automobile may wish to access an item of content, such as the broadcast of a sporting event. While traveling, the user may leave the range of the broadcast transmitter, thereby requiring the user to browse through plurality of accessible broadcast transmitters to find a broadcast transmitter that is outputting the desired item of content. This requirement may be difficult and even dangerous as the user in the automobile manipulates multiple functions of a broadcast content receiver to find the item of content, which may draw the user's attention away from driving the vehicle.

Further, a user may wish to access broadcast content having desired characteristics, such as music, talk format and the like. However, if the user ventures over a range greater than the transmitting range of a broadcast transmitter broadcasting the desired content, the user has to scan broadcasts from broadcast transmitter that are within range of the broadcast content receiver. This process may be time consuming and bothersome as the user is required to manually interact with each broadcast until the desired characteristic is found. This may become even more trouble some due to commercials and the like which further delay the user's interaction with the content.

Therefore, it would be desirable to provide a method and apparatus suitable for providing broadcast content based upon location.

SUMMARY OF THE INVENTION

Accordingly, the present invention is directed to a system and method interacting with broadcast content based upon position. By providing a method and apparatus suitable for interacting with broadcast content based upon position, a user has a dynamic and flexible way of interacting with broadcast content. In a first aspect of the present invention, a method for determining availability of broadcast content to a broadcast content receiver includes determining position of a broadcast content receiver. The broadcast content receiver is suitable for obtaining broadcast content. A broadcast data is queried by the broadcast content receiver for broadcast transmittal data corresponding to the determined position of the broadcast content receiver. The broadcast database includes broadcast transmittal data including broadcast content access data suitable for enabling the broadcast content receiver to access broadcast content and broadcast location data suitable for enabling the broadcast content receiver to determine location accessibility of the broadcast content from a broadcast transmitter.

In a second aspect of the present invention, a broadcast content receiver suitable for receiving broadcast content based upon position includes a position determiner, the position determiner suitable for determining position of the broadcast content receiver. A broadcast content accessor is also included, the broadcast content accessor suitable for accessing content from a broadcast transmitter. A processor suitable for performing a program of instructions is coupled to the position determiner and the broadcast content accessor. The program of instruction configures the broadcast content receiver to query a broadcast database accessible to the processor, the broadcast database including broadcast transmittal data including broadcast content access data suitable for enabling the broadcast content accessor to access a broadcast transmitter and broadcast location data suitable for enabling the processor to determine location accessibility of broadcast content from a broadcast transmitter.

In a third aspect of the present invention, a broadcast content receiver suitable for receiving broadcast content based upon position includes means for determining a position, the position determining means suitable for determining position of the broadcast content receiver. The broadcast content receiver also includes means for accessing broadcast content, the broadcast content accessing means suitable for accessing content from a broadcast transmitter. In which, a broadcast database is queried, the broadcast database including broadcast transmittal data having broadcast content access data suitable for enabling the broadcast content accessing means to access a broadcast transmitter and broadcast location data suitable for determining location accessibility of broadcast content from a broadcast transmitter.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 9, embodiments of the present invention are shown. Broadcast content is one of the most prevalent forms of information dissemination available. Broadcast transmitters, such as radio stations, television stations, satellite networks, and the like, provide a wide range of content in a manner that is widely accessible to users in a cost-effective and pervasive manner. However, there are times when the range of a broadcast transmitter is not sufficient for the needs of a user, which may require the user to access multiple broadcast transmitters to interact with the broadcast content. By providing a method and apparatus suitable for interacting with broadcast content based upon position, a user has a dynamic and flexible way of interacting with broadcast content.

Figure 1:
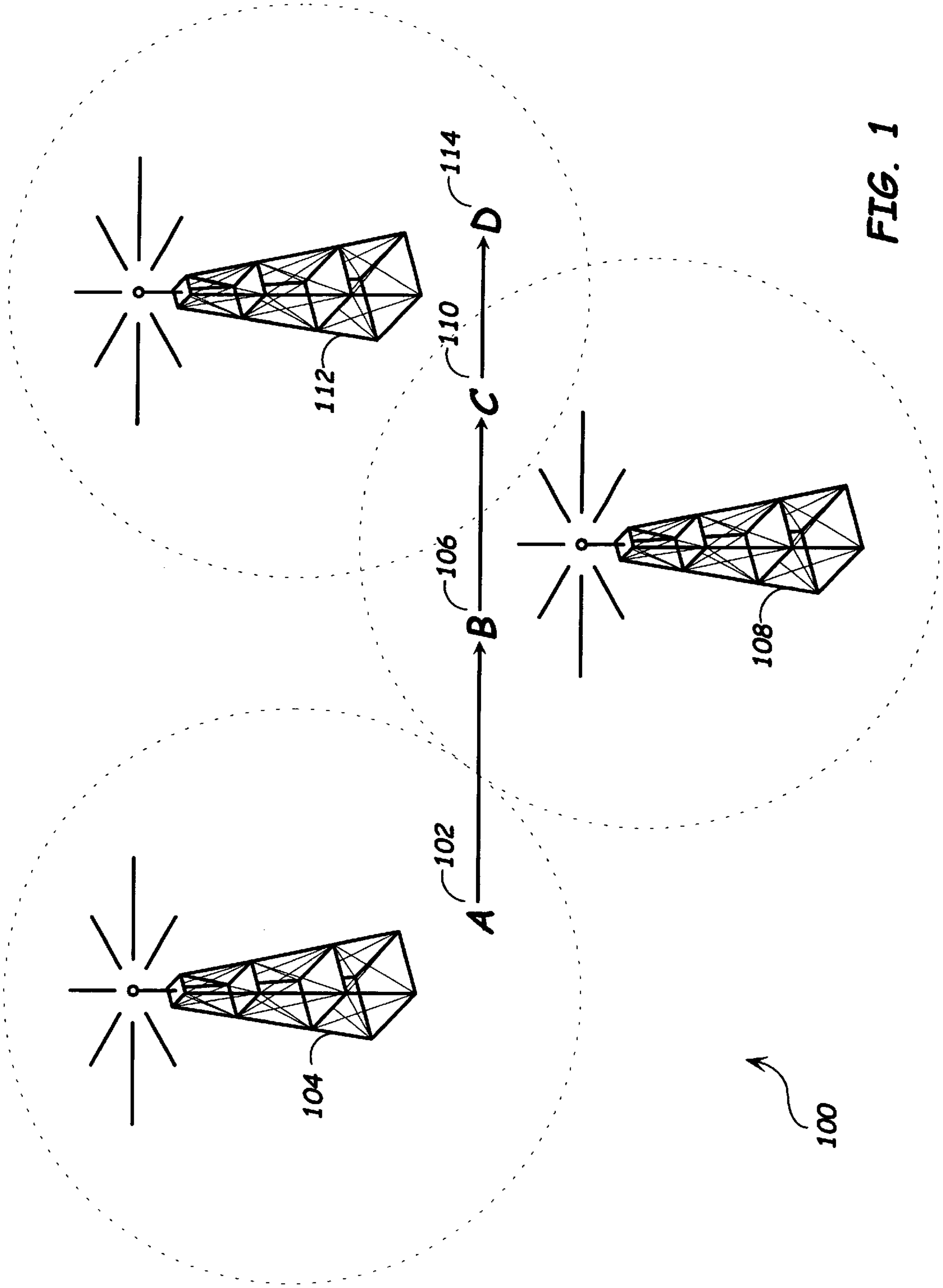
FIG. 1 is an illustration of an embodiment of the present invention wherein determined position of a broadcast content receiver relative to a plurality of broadcast transmitters is utilized to provide broadcast content.

Referring now to FIG. 1, an embodiment 100 of the present invention is shown wherein determined position of a broadcast content receiver relative to a plurality of broadcast transmitters is utilized to provide broadcast content. A user, when moving from one location to the next, may travel through the transmitting range of a plurality of broadcast transmitters. For example, a user at point A 102 may be within range of a first broadcast transmitter 104, and access broadcast content from that transmitter. However, when the user moves to point B 106, the user may be out of range of the first broadcast transmitter 104, and therefore unable to access content provided by the first broadcast transmitter 104. But, when the user is positioned at point B 106, the user may be within range of a second broadcast transmitter 108 and may thus access content provided by the second broadcast transmitter 108. When the user travels to point C 110, the user may still be within the range of the second broadcast transmitter 108 as well as a third broadcast transmitter 112, but when traveling to point D 114, may be within the range of only the third broadcast transmitter 112. By utilizing position data of a broadcast content receiver utilized by the user, the position data may be utilized in conjunction with broadcast transmittal data in order to enable a user to efficiently and effectively access broadcast transmitters when moving through different broadcasting ranges.

Figure 2:
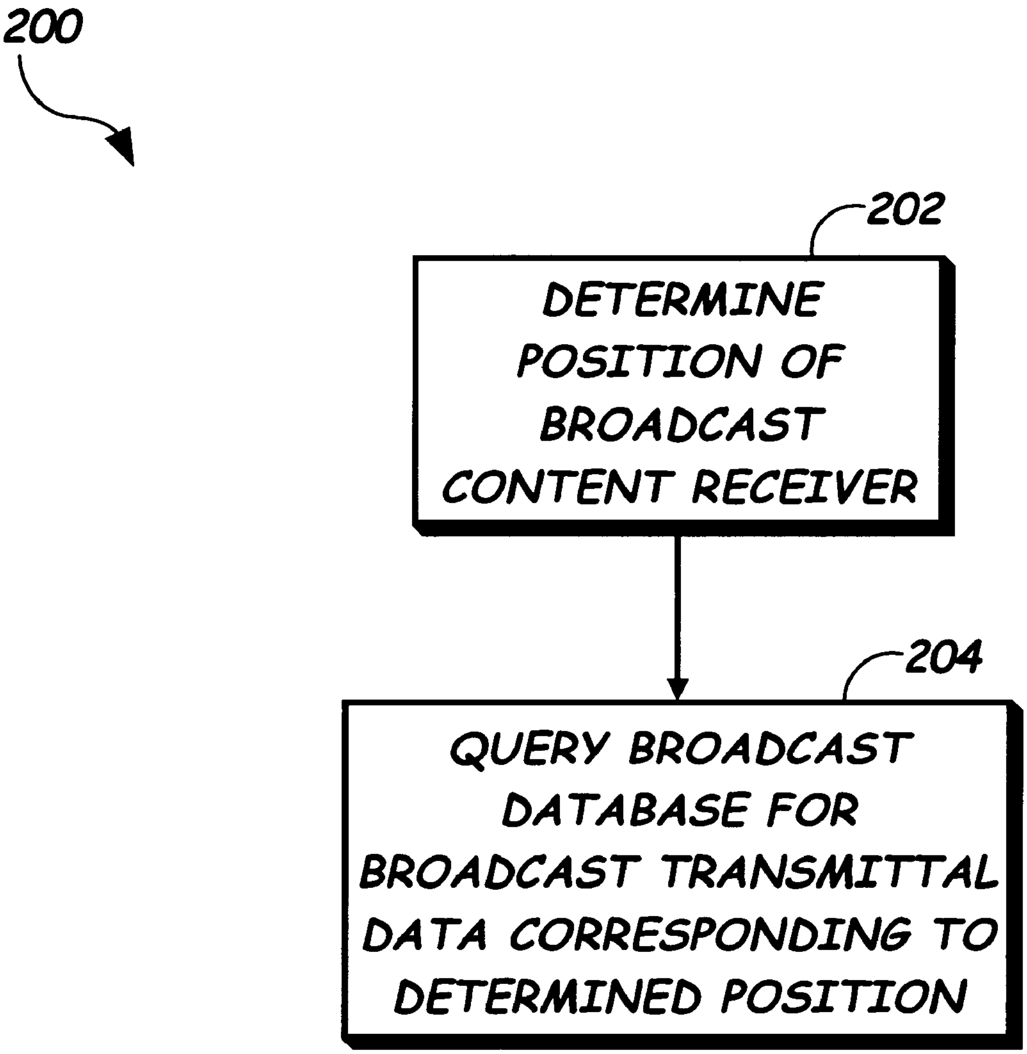
FIG. 2 is flow diagram depicting an exemplary method of the present invention wherein determined position of a broadcast content receiver is utilized in conjunction with a broadcast database including broadcast transmittal data to enable the broadcast content receiver to obtain information regarding broadcast transmitters available to the broadcast content receiver.

For example, as shown in the exemplary method 200 depicted in FIG. 2, a determined position of a broadcast content receiver is utilized in conjunction with a broadcast database including broadcast transmittal data to enable the broadcast content receiver to obtain information regarding broadcast transmitters available to the broadcast content receiver. A position of a broadcast content receiver is determined 202. A broadcast database is queried for broadcast transmittal data corresponding to the determined position 204.

The broadcast database may include broadcast content access data suitable for enabling a broadcast content receiver to access broadcast content from a broadcast transmitter. For example, broadcast content access data may include a frequency, channel and the like to enable a broadcast content receiver to find and access the content. The broadcast database may also include broadcast location data suitable for enabling a broadcast content receiver to determine location accessibility of the broadcast content from a broadcast transmitter. For instance, broadcast location data may include location of broadcast transmitters, transmittal range of the broadcast transmitter, and the like as contemplated by a person of ordinary skill in the art so as to enable a broadcast content receiver to determine broadcast content accessible at a position.

Figure 3:
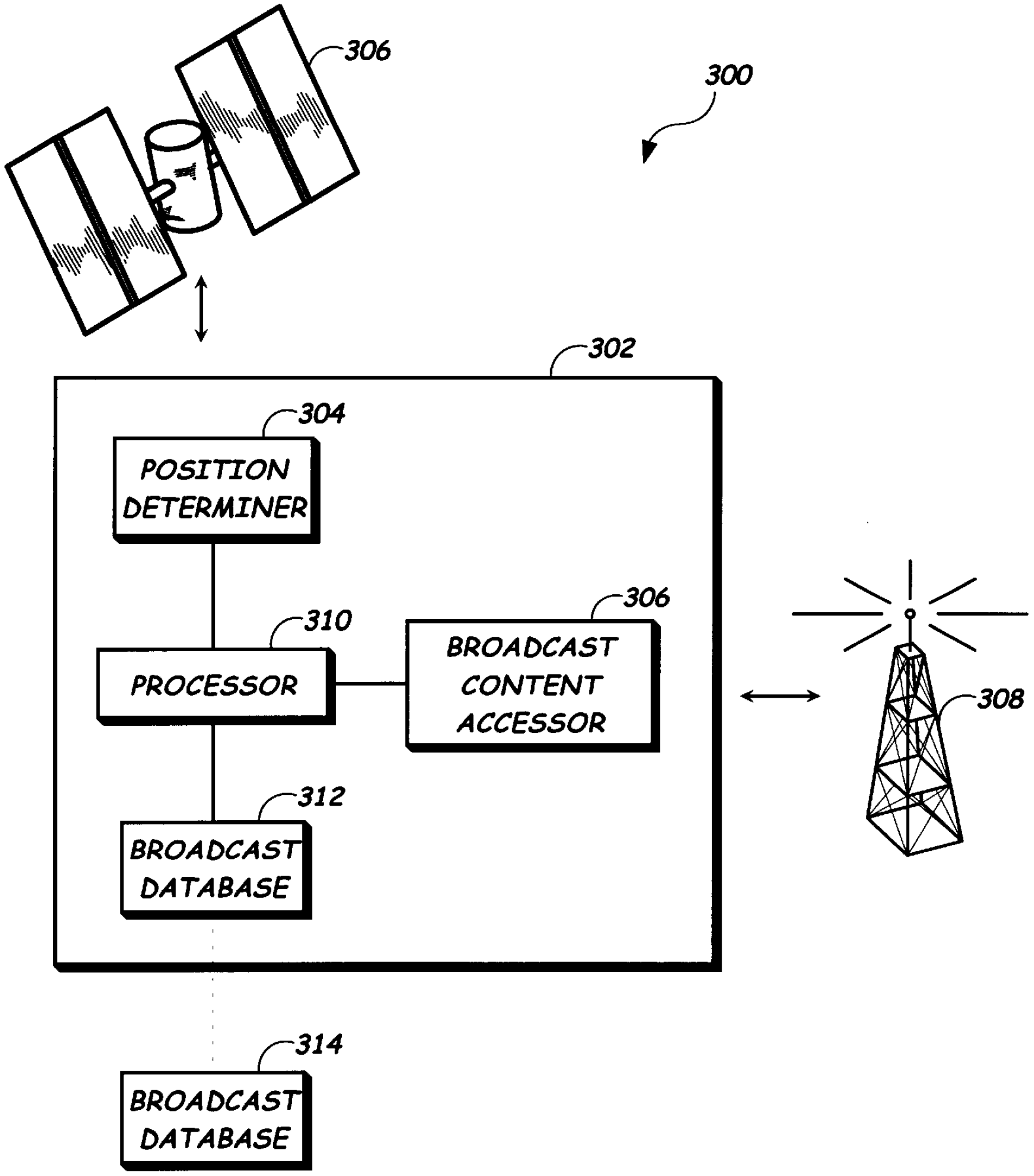
FIG. 3 is an illustration depicting an embodiment of the present invention wherein a broadcast content receiver suitable for determining position and utilizing position data to obtain broadcast content is shown.

Referring now to FIG. 3, an embodiment 300 of the present invention is shown wherein a broadcast content receiver suitable for determining position and utilizing position data to obtain broadcast content is shown. A broadcast content receiver 302 includes a position determiner 304 suitable for determining position of the broadcast content receiver 302. A position determiner 304 may include a global positioning system (GPS) receiver which may determine the position by utilizing global positioning system (GPS) satellites 306 to determine position, and like methods of determining position as contemplated by a person of ordinary skill in the art without departing from the spirit and scope of the present invention. The broadcast content receiver 302 may also include a broadcast content accessor 306 to access content from a broadcast transmitter 308. For instance, a variety of broadcast content accessors are contemplated by the present invention without departing from the spirit and scope thereof, such as a radio receiver suitable for receiving AM, FM and the like radio frequencies, a television receiver, satellite receiver, and the like suitable receiver for receiving and accessing broadcast content. A processor 310 suitable for performing a program of instructions is coupled to the position determiner 304 and the broadcast content accessor 306. The processor 310 may query a broadcast databases stored locally 312 or accessible over a network 314 to obtain broadcast transmittal data.

Thus, by utilizing a position determiner 304 to determine position of the broadcast content receiver 302, the broadcast content receiver 302 may utilize the position data in conjunction with a broadcast database 312 & 314 to enable a broadcast content accessor 306 to access content from a broadcast transmitter 308. In this way, the broadcast content receiver 302 may determine accessible broadcast transmitters in a dynamic and efficient manner.

Figure 4:
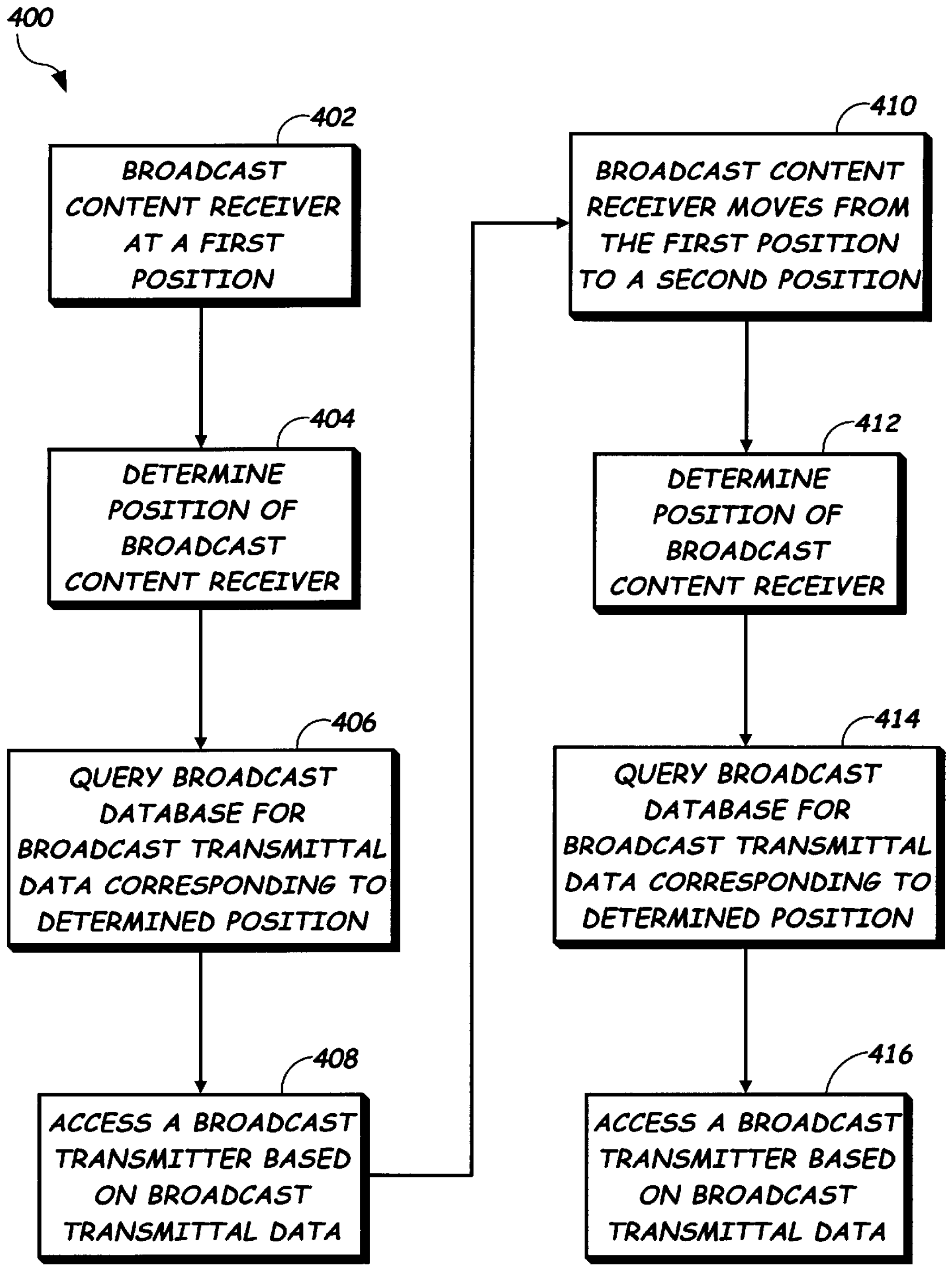
FIG. 4 is a flow diagram illustrating an exemplary method of the present invention wherein a broadcast content receiver moved from a first position to a second position determines content accessible to the broadcast content receiver at the broadcast content receiver's position.

Referring now to FIG. 4, an exemplary method 400 of the present invention is shown wherein a broadcast content receiver moved from a first position to a second position determines content accessible to the broadcast content receiver at the broadcast content receiver's position. A broadcast content receiver is at a first position 402. The position of the broadcast content receiver is determined 404. A broadcast database is then queried for broadcast transmittal data corresponding to the determined position 406 and a broadcast transmitter is accessed based on the broadcast transmittal data 408. For instance, a frequency for a broadcast transmitter, such as radio station, may be determined from the broadcast transmittal data, which is accessible from the location of the broadcast content receiver as determined from the broadcast transmittal data.

The broadcast content receiver is then moved from the first position to a second position 410. The position of the broadcast content receiver is determined 412, such as through a global positioning system (GPS), and a broadcast database is queried for broadcast transmittal data to the new determined second position 414. A broadcast transmitter is then accessed based on the broadcast transmittal data 416. The are a variety of reasons and methods for the desirability of accessing a first broadcast transmitter at a first location and a second broadcast transmitter at a second location, as based on the determined positions, which are contemplated by the present invention without departing from the spirit and scope thereof.

Figure 5:
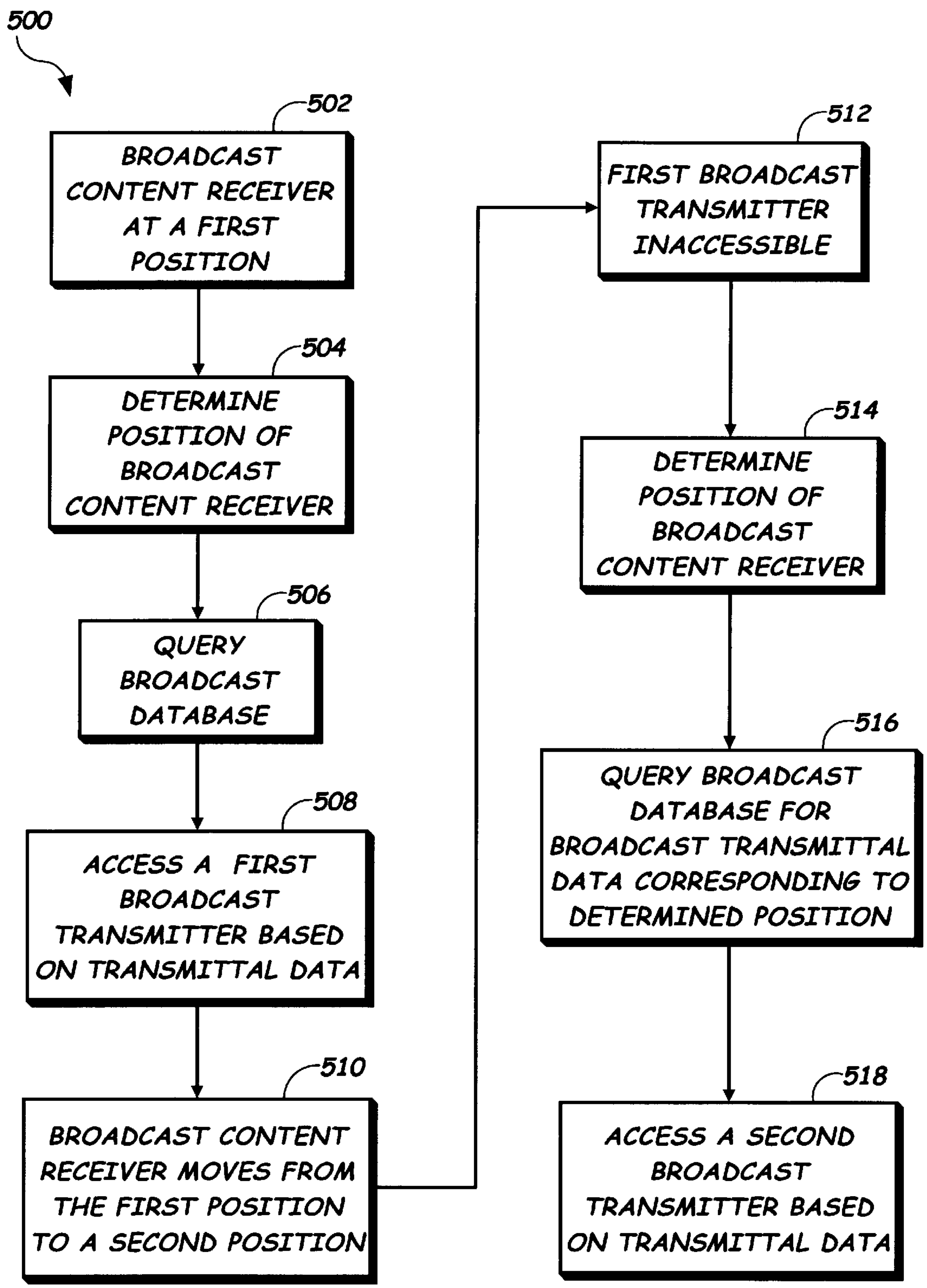
FIG. 5 is a flow diagram depicting an exemplary method of the present invention wherein a broadcast content receiver accesses a second broadcast transmitter based found by querying a broadcast database due to inaccessibility of a first broadcast transmitter.

For example, as shown in the exemplary method 500 of FIG. 5, a broadcast content receiver may access a first broadcast transmitter at a first location and due to inaccessibility of the first broadcast transmitter at the second location may then determine availability of a second broadcast transmitter at the second location. A broadcast content receiver is at a first position 502, such as point A 102 (FIG. 1). The position of the broadcast content receiver is determined 504 and a broadcast database queried 506 for broadcast transmittal data. A first broadcast transmitter is accessed based on the broadcast transmittal data 508, such as the first broadcast transmitter 104 (FIG. 1).

Then, the broadcast content receiver moves from the first position to a second position 510, such as point B 106 (FIG. 1). However, at point B 106 (FIG. 1), the first broadcast transmitter 104 is not accessible to the broadcast content receiver. Therefor, the position of the broadcast content receiver is determined 514, and a broadcast database is queried for broadcast transmittal data corresponding to the determined position 516. A second broadcast transmitter is then accessed based on the transmittal data 518, such as the second broadcast transmitter 108 (FIG. 1). In this way, when the broadcast content receiver passes beyond the range of the first broadcast transmitter 104 (FIG. 1), a second broadcast transmitter 108 (FIG. 1) may be found for receiving broadcast content. It may be preferable to continue to receive broadcast content having similar characteristics or even a similar item of content from the second broadcast transmitter as received from the first broadcast transmitter.

Figure 6:
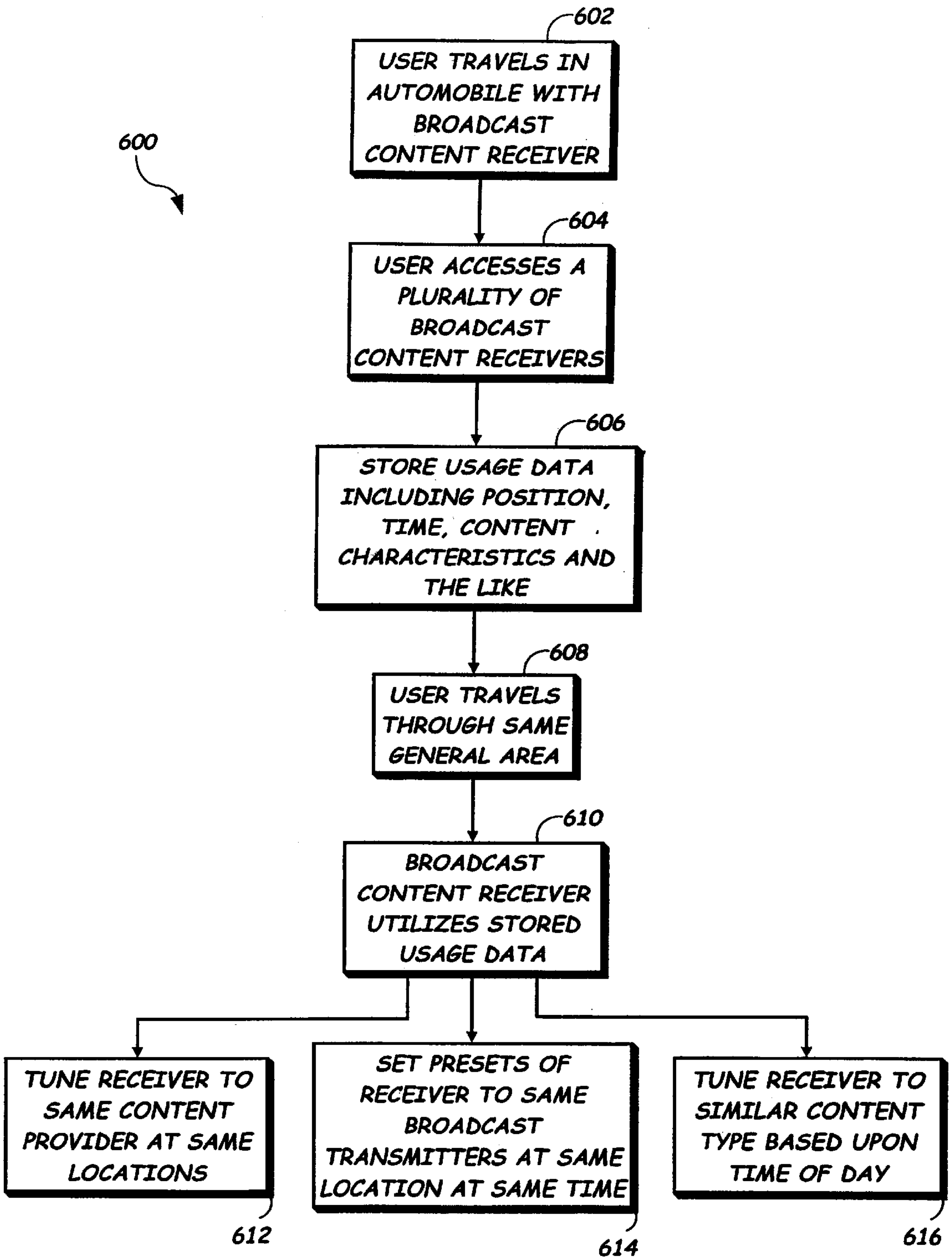
FIG. 6 is a flow diagram of an exemplary method of the present invention wherein usage data is stored and utilized by a broadcast content receiver for providing increased functionality.

Referring now to FIG. 6, an exemplary method 600 of the present invention is shown wherein usage data is stored and utilized by a broadcast content receiver for providing increased functionality. A user travels in an automobile equipped with a broadcast content receiver 602. During the user's travels, a plurality of broadcast content receivers are accessed 604. The broadcast content receiver stores usage data, including position of the user, time, content characteristics and the like 606. Thus, when the user travels through the same general area 608 corresponding to the stored usage data, the broadcast content receiver utilizes the stored usage data 610.

Stored usage data may be utilized in a variety of ways without departing from the spirit and scope of the present invention. For example, a broadcast content receiver may be tuned to the same content provider at similar locations 612 as indicated through a combination of the current location of the broadcast content receiver and content providers accessed at those locations. Presets of the broadcast content receiver, such as a radio, may be set to the same broadcast transmitters at same location at the same time 614. For example, broadcast transmitters accessed in the morning by a broadcast content receiver may be set in the stored locations, wherein different broadcast transmitters accessed during a drive home may be set. The broadcast content receiver may also tune to similar content type based upon the time of day 616. For instance, a user may typically access talk shows in the morning, thus, when traveling outside the range of normally access broadcast transmitters, broadcast transmitters outputting similar content may be utilized.

Figure 7:
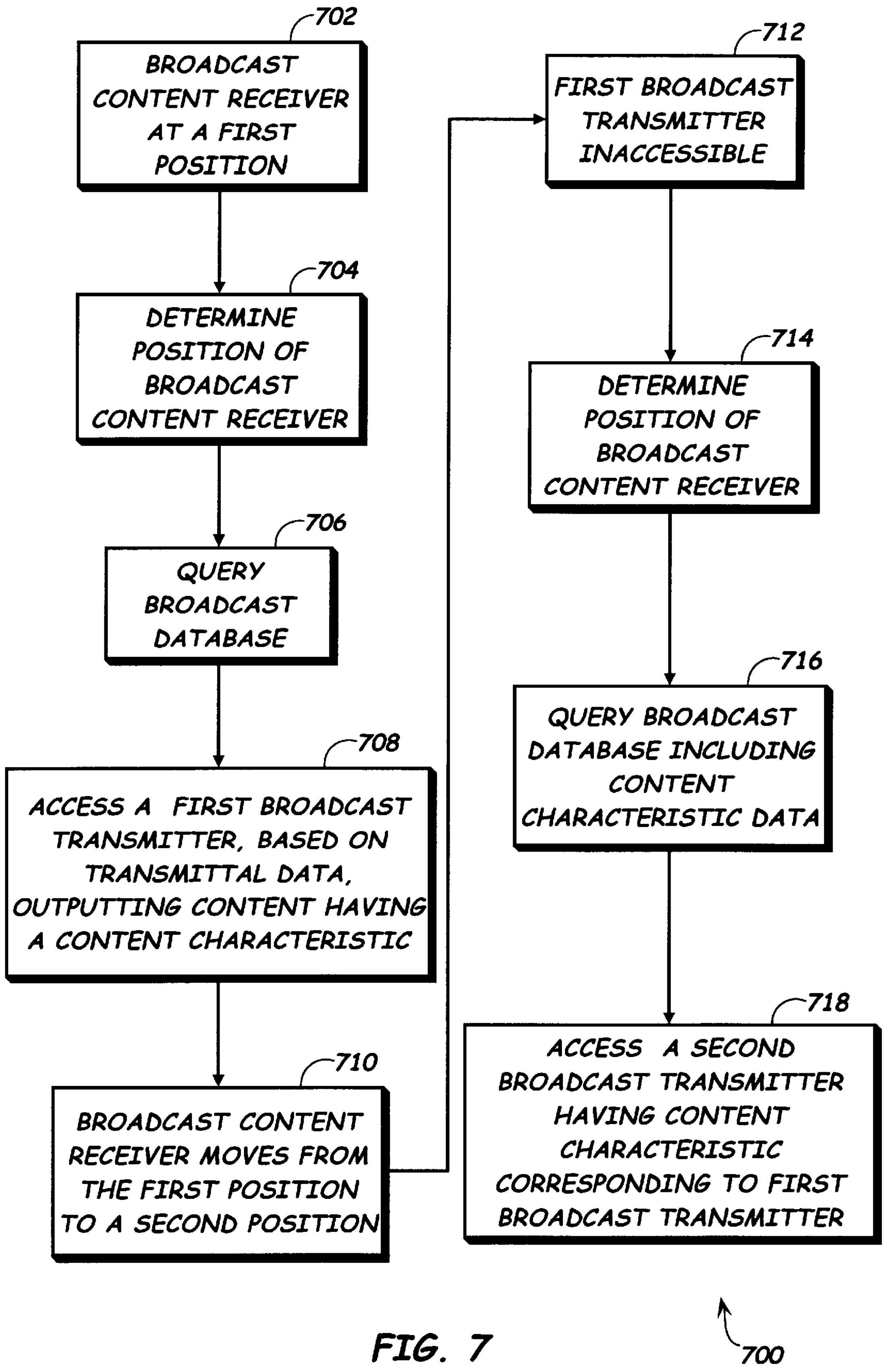
FIG. 7 is a flow diagram depicting an exemplary method of the present invention wherein a broadcast content receiver accesses a second broadcast transmitter when a first broadcast transmitter is inaccessible, the second broadcast transmitter having similar content characteristics of the first broadcast content receiver.

Referring now to FIG. 7, an exemplary method 700 of the present invention is shown wherein a broadcast content receiver accesses a second broadcast transmitter when a first broadcast transmitter is inaccessible, the second broadcast transmitter having similar content characteristics. A broadcast content receiver is at a first position 702. The position of the broadcast content receiver is determined 704 and a broadcast database accessed 706 to identify a broadcast transmitter. A first broadcast transmitter is accessed based on transmittal data, the first broadcast transmitter outputting content having a content characteristic 708. A content characteristic may include performing artist, type of content, program and like characteristics as contemplated by a person of ordinary skill in the art.

The broadcast content receiver then moves from the first position to a second position 710, in which, the first broadcast transmitter is inaccessible 712. The position of the broadcast content receiver is determined 714, and a broadcast data is queried, the broadcast data including content characteristic data 716 of broadcast transmitter. A second broadcast transmitter is identified and accessed, the second broadcast transmitter having a content characteristic corresponding to the first broadcast transmitter 718. In this way, a broadcast content receiver moving between ranges of broadcast transmitters may output content of a characteristic as desired by a user without requiring the user to manually search through a vast number of broadcast transmitters.

Figure 8:
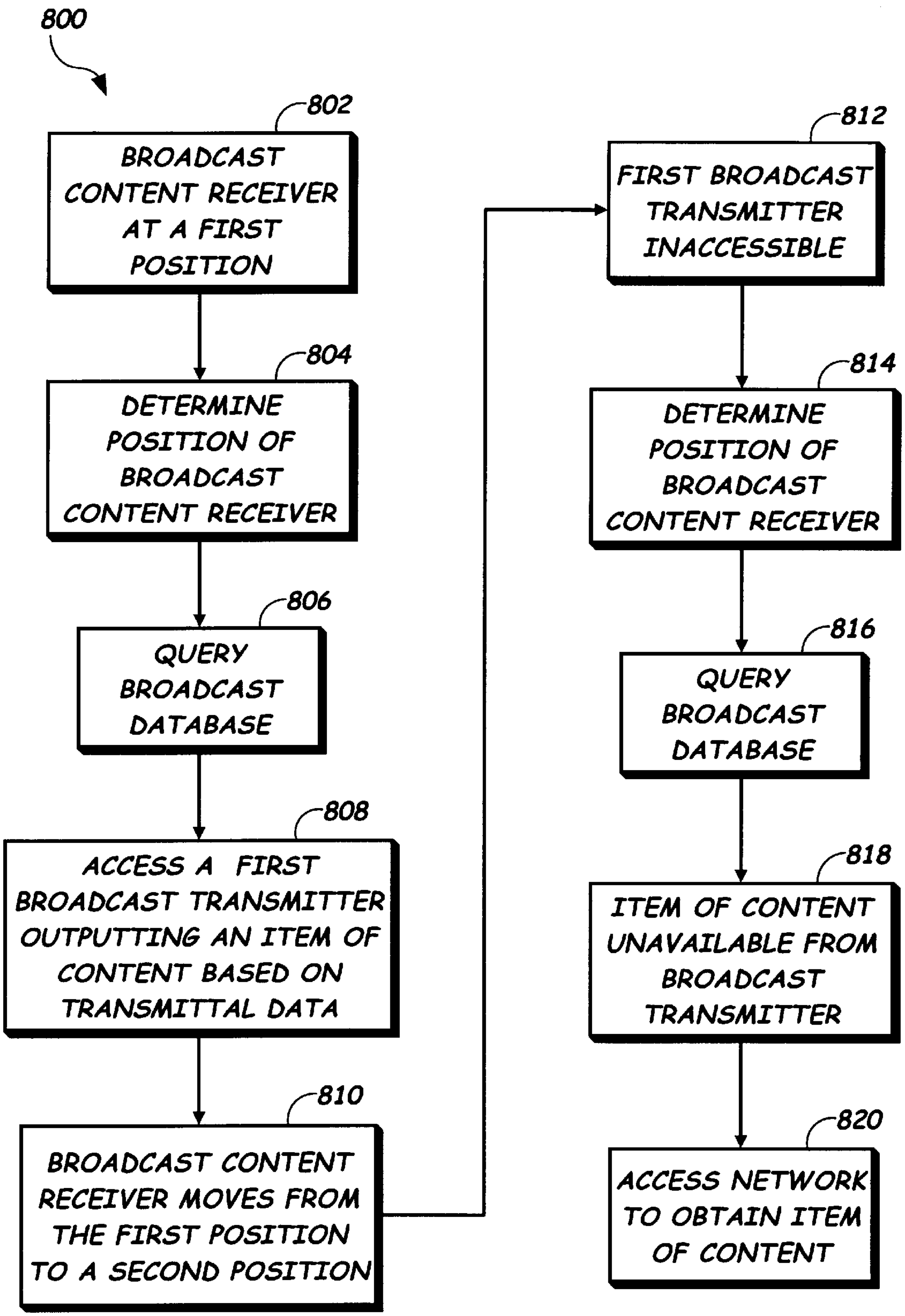
FIG. 8 is a flow diagram illustrating an exemplary method wherein content accessed from a broadcast transmitter becomes unavailable to a broadcast content receiver, the broadcast content receiver accesses a network to obtain access to the item of content.

Referring now to FIG. 8, an exemplary method 800 of the present invention is shown wherein content accessed from a broadcast transmitter becomes unavailable to a broadcast content receiver, the broadcast content receiver accesses a network to obtain access to the item of content. A broadcast content receiver is at a first position 802, at which the position of the broadcast content receiver is determined 804, and a broadcast database queried 806. A first broadcast transmitter, outputting an item of content, is access based on transmittal data 808. The broadcast content receiver then moves from the first position to a second position 810. At the second position, the first broadcast transmitter becomes inaccessible 812. The position of the broadcast content receiver is then determined 814 and a broadcast database queried 816.

If the item is content is unavailable from a broadcast transmitter 818, a network is accessed to obtain the item of content 820. For example, characteristic data included in the broadcast database may indicate that that particular kind of content is not available from broadcast transmitters located within range of the broadcast content receiver. Therefore, the broadcast content receiver may access a network, such as a cellular, PCS, wireless network, and the like, to access the item of content, such as through an MP3 file, streaming data, and the like, downloaded to the broadcast content receiver. It should be apparent to a person of ordinary skill in the art that a variety of networks and content formats are contemplated by the present invention without departing from the spirit and scope thereof.

Figure 9:
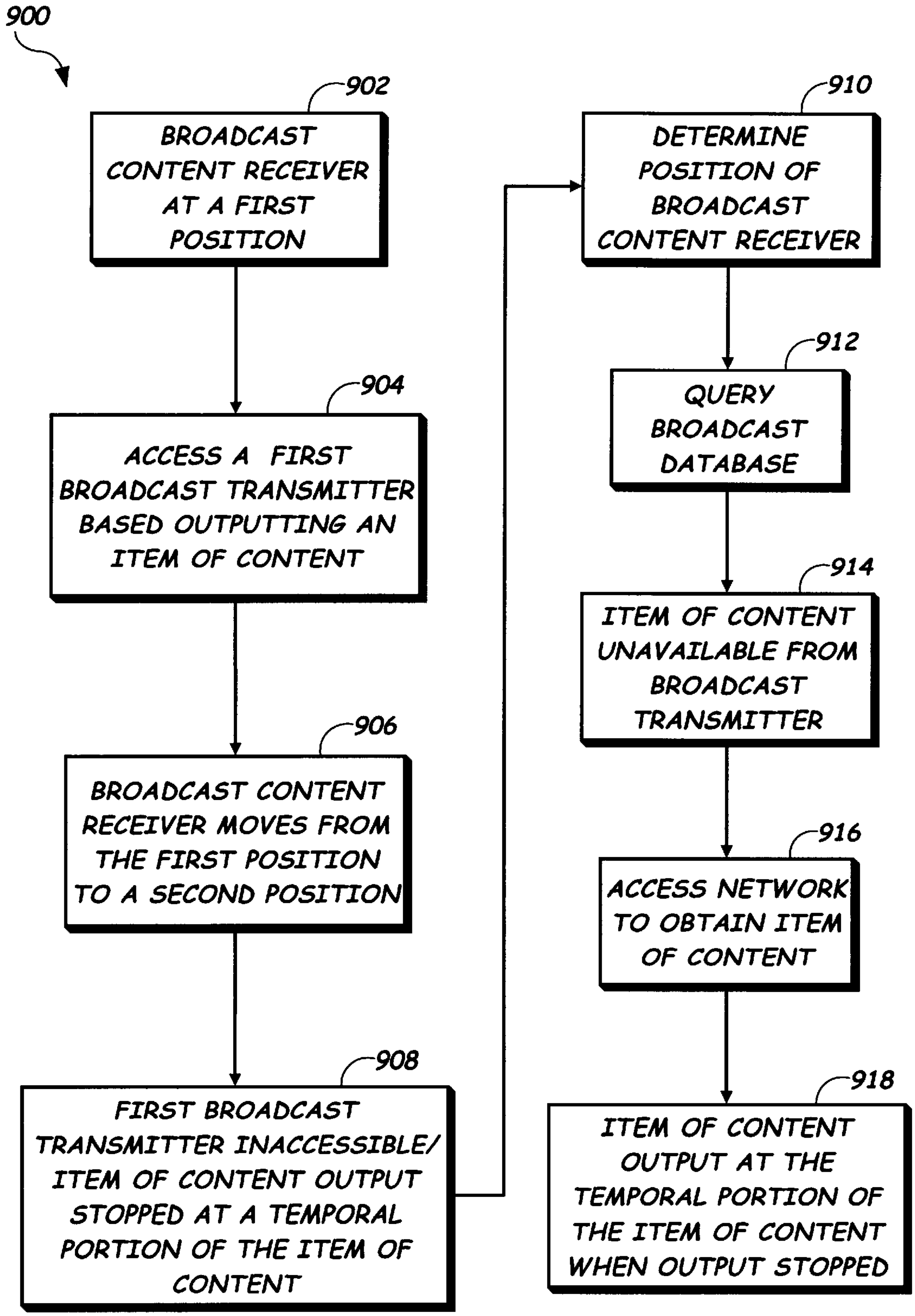
FIG. 9 is a flow diagram of an exemplary method of the present invention wherein an item of content received from a first broadcast transmitter becomes inaccessible at a temporal portion of the item of content, the item of content is output at a general temporal portion corresponding to the last output portion of the item of content.

Referring now to FIG. 9, an exemplary method of the present invention is shown wherein an item of content received from a first broadcast transmitter becomes inaccessible at a temporal portion of the item of content, the item of content is output at a general temporal portion corresponding to the last output portion of the item of content. A broadcast content receiver is located at a first position 902. A first broadcast transmitter outputting an item of content is accessed 904. An item of content may include a song, television program, and the like. The broadcast content receiver then moves from the first position to a second position 906. When moving, the first broadcast transmitter becomes inaccessible. Therefore, an item of content output by the broadcast content receiver is stopped at a temporal portion of the item of content 908, such as at a certain time period of a song. The position of the broadcast content receiver is determined 910 and a broadcast database queried 912. If the item of content is unavailable from a broadcast transmitter 914, a network is accessed to obtain the item of content 916. The item of content is then output at a temporal portion corresponding to the temporal portion when previous output of the item of content was stopped 918. In this way, a user may have a continuous listening experience. Although access to a network is described to obtain the item of content and then output the item of content at the same general temporal portion, it should be apparent to a person of ordinary skill in the art that a variety of sources of items of content are contemplated, such as locally stored items, items from other broadcast transmitters that are buffered, and the like.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the method and apparatus for interaction with broadcast content based upon position of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for determining availability of broadcast content to a broadcast content receiver, comprising:

determining a position of a broadcast content receiver, the broadcast content receiver suitable for obtaining broadcast content;

querying a broadcast database accessible by the broadcast content receiver for broadcast transmittal data corresponding to the determined position of the broadcast content receiver, the broadcast database including broadcast transmittal data including broadcast content access data suitable for enabling the broadcast content receiver to access broadcast content and broadcast location data suitable for enabling the broadcast content receiver to determine location accessibility of the broadcast content from a broadcast transmitter; and wherein the broadcast content receiver is a television receiver.

2. The method as described in claim 1, further comprising accessing a broadcast transmitter by a broadcast content receiver based upon the broadcast transmittal data to receive broadcast content.

3. The method as described in claim 1, wherein the broadcast content receiver is at a first location, the broadcast content receiver accesses a first broadcast transmitter and wherein the broadcast content receiver is moved to a second location, the broadcast content receiver accesses a second broadcast transmitter.

4. The method as described in claim 3, wherein the broadcast content receiver is at the second location, the first broadcast transmitter is inaccessible to the broadcast content receiver.

5. The method as described in claim 1, wherein the broadcast content receiver accesses a first broadcast transmitter, when the first broadcast transmitter is inaccessible to the broadcast content receiver, querying the broadcast database for a second broadcast transmitter.

6. The method as described in claim 5, wherein the second broadcast transmitter is queried based upon at least one of content characteristic data and usage data of the broadcast content receiver.

7. The method as described in claim 1, wherein determining location of the broadcast content receiver includes utilizing a global positioning system.

8. The method as described in claim 1, wherein the broadcast database further includes content characteristic data of content broadcast by a broadcast transmitter.

9. The method as described in claim 1, where in the content characteristic data includes at least one of content type, style and available item of content.

10. The method as described in claim 1, wherein content is not accessible by a broadcast content receiver from a broadcast transmitter, accessing a network to obtain content.

11. The method as described in claim 10, wherein an item of content accessible by a broadcast content receiver when at a first location is no longer accessible to the content receiver when at a second location and the item of content is not available to the content receiver from a broadcast transmitter, a network is accessed by the broadcast content receiver to obtain the item of content.

12. The method as described in claim 11, wherein the item of content obtained from the network is output by the broadcast content receiver at a temporal portion of the item of content corresponding to a temporal portion of the item of content as received from the broadcast content receiver at the first location.

13. The method as described in claim 1, further comprising setting a preset corresponding to the broadcast content access data.

14. A method for determining availability of broadcast content to a broadcast content receiver, comprising:

determining a position of a broadcast content receiver, the broadcast content receiver suitable for obtaining broadcast content;

querying a broadcast database accessible by the broadcast content receiver for broadcast transmittal data corresponding to the determined position of the broadcast content receiver, the broadcast database including broadcast transmittal data including broadcast content access data suitable for enabling the broadcast content receiver to access broadcast content and broadcast location data suitable for enabling the broadcast content receiver to determine location accessibility of the broadcast content from a broadcast transmitter; and wherein the broadcast database is accessible to the broadcast content receiver by at least one of being stored locally to the broadcast content receiver and accessible over a network.

15. The method as described in claim 14, wherein the network includes a wireless network.

16. A method for determining availability of broadcast content to a broadcast content receiver, comprising:

determining a position of a broadcast content receiver, the broadcast content receiver suitable for obtaining broadcast content;

querying a broadcast database accessible by the broadcast content receiver for broadcast transmittal data corresponding to the determined position of the broadcast content receiver, the broadcast database including broadcast transmittal data including broadcast content access data suitable for enabling the broadcast content receiver to access broadcast content and broadcast location data suitable for enabling the broadcast content receiver to determine location accessibility of the broadcast content from a broadcast transmitter;

storing usage data of the broadcast content receiver, the usage data suitable for identifying at least one broadcast transmitter accessed by the broadcast content receiver and at least one location of the broadcast content receiver when accessing the broadcast transmitter; and wherein the broadcast content receiver is a television receiver.

17. The method as described in claim 16, wherein the broadcast content receiver utilizes the stored usage data to access the broadcast transmitter indicated by the storage usage data when the broadcast content receiver is at least one of generally located at the location indicated by the stored usage data and able to access the broadcast transmitter as indicated by location data.

18. A broadcast content receiver suitable for receiving broadcast content based upon position, comprising:

a position determiner, the position determiner suitable for determining position of the broadcast content receiver;

a broadcast content accessor, the broadcast content accessor suitable for accessing content from a broadcast transmitter;

a processor suitable for performing a program of instructions coupled to the position determiner and the broadcast content accessor, wherein the program of instruction configures the broadcast content receiver to query a broadcast database accessible to the processor, the broadcast database including broadcast transmittal data including broadcast content access data suitable for enabling the broadcast content accessor to access a broadcast transmitter and broadcast location data suitable for enabling the processor to determine location accessibility of broadcast content from a broadcast transmitter; and wherein the broadcast content receiver is a television receiver.

19. The broadcast content receiver as described in claim 18, wherein the broadcast content accessor accesses a broadcast transmitter based upon the broadcast transmittal data to receive broadcast content.

20. The broadcast content receiver as described in claim 18, wherein the broadcast content receiver is at a first location the broadcast accessor accesses a first broadcast transmitter and wherein the broadcast content receiver is at a second location the broadcast accessor accesses a second broadcast transmitter.

21. The broadcast content receiver as described in claim 20, wherein the broadcast content receiver is at the second location, the first broadcast transmitter is inaccessible to the broadcast content receiver.

22. The broadcast content receiver as described in claim 18, wherein the broadcast content accessor accesses a first broadcast transmitter, when the first broadcast transmitter is inaccessible to the broadcast content receiver, the processor queries the broadcast database for a second broadcast transmitter.

23. The broadcast content receiver as described in claim 22, wherein the second broadcast transmitter is queried based upon at least one of content characteristic data and usage data of the broadcast content receiver.

24. The broadcast content receiver as described in claim 18, wherein the position determiner is a global positioning system.

25. The broadcast content receiver as described in claim 18, wherein the broadcast database further includes content characteristic data of content broadcast by a broadcast transmitter.

26. The broadcast content receiver as described in claim 25, wherein the content characteristic data includes at least one of content type, style and available item of content.

27. The broadcast content receiver as described in claim 18, wherein content is not accessible by a broadcast content accessor from a broadcast transmitter, accessing a network to obtain content.

28. The broadcast content receiver as described in claim 27, wherein an item of content accessible by a broadcast content accessor when at a first location is no longer accessible to the content receiver when at a second location and the item of content is not available to the content receiver from a broadcast transmitter, a network is accessed by the broadcast content receiver to obtain the item of content.

29. The broadcast content receiver as described in claim 28, wherein the item of content obtained from the network is output at a temporal portion of the item of content corresponding to a temporal portion of the item of content as received from the broadcast content receiver at the first location.

30. The broadcast content receiver as described in claim 18, wherein a preset is set based on the broadcast transmittal data, the preset suitable for enabling a broadcast content accessor to access a broadcast transmitter based upon the broadcast content access data.

31. A broadcast content receiver suitable for receiving broadcast content based upon position, comprising:

a position determiner, the position determiner suitable for determining position of the broadcast content receiver;

a broadcast content accessor, the broadcast content accessor suitable for accessing content from a broadcast transmitter;

a processor suitable for performing a program of instructions coupled to the position determiner and the broadcast content accessor, wherein the program of instruction configures the broadcast content receiver to query a broadcast database accessible to the processor, the broadcast database including broadcast transmittal data including broadcast content access data suitable for enabling the broadcast content accessor to access a broadcast transmitter and broadcast location data suitable for enabling the processor to determine location accessibility of broadcast content from a broadcast transmitter; and wherein the broadcast database is accessible to the processor by at least one of stored locally and accessible over a network.

32. The broadcast content receiver as described in claim 31, wherein the network includes a wireless network.

33. A broadcast content receiver suitable for receiving broadcast content based upon position, comprising:

a position determiner, the position determiner suitable for determining position of the broadcast content receiver;

a broadcast content accessor, the broadcast content accessor suitable for accessing content from a broadcast transmitter;

a processor suitable for performing a program of instructions coupled to the position determiner and the broadcast content accessor, wherein the program of instruction configures the broadcast content receiver to query a broadcast database accessible to the processor, the broadcast database including broadcast transmittal data including broadcast content access data suitable for enabling the broadcast content accessor to access a broadcast transmitter and broadcast location data suitable for enabling the processor to determine location accessibility of broadcast content from a broadcast transmitter;

storage suitable for storing usage data of the broadcast content receiver, the usage data suitable for identifying at least one broadcast transmitter accessed by the broadcast content receiver and at least one location of the broadcast content receiver when accessing the broadcast transmitter; and wherein the broadcast content receiver is a television receiver.

34. The broadcast content receiver as described in claim 33, wherein the processor utilizes the stored usage data to instruct the broadcast content accessor to access the broadcast transmitter indicated by the stored usage data when the broadcast content receiver is at least one of generally located at the location indicated by the stored usage data an able to access the broadcast transmitter as indicated by location data as indicated by the position determiner.

35. A broadcast content receiver suitable for receiving broadcast content based upon position, comprising:

means for determining a position, the position determining means suitable for determining position of the broadcast content receiver;

means for accessing broadcast content, the broadcast content accessing means suitable for accessing content from a broadcast transmitter;

wherein a broadcast database is queried, the broadcast database including broadcast transmittal data including broadcast content access data suitable for enabling the broadcast content accessing means to access a broadcast transmitter and broadcast location data suitable for determining location accessibility of broadcast content from a broadcast transmitter; and wherein the broadcast content receiver is a television receiver.

36. The broadcast content receiver as described in claim 35, wherein the broadcast content receiver accesses a first broadcast transmitter, when the broadcast content receiver is inaccessible to the broadcast content receiver, querying the broadcast database for a second broadcast transmitter.

37. The broadcast content receiver as described in claim 36, wherein the second broadcast transmitter is queried based upon at least one of content characteristic data and usage data of the broadcast content receiver.

38. The broadcast content receiver as described in claim 35, further comprising means for storing usage data of the broadcast content receiver, the usage data suitable for identifying at least one broadcast transmitter accessed by the broadcast content receiver and at least one location of the broadcast content receiver when accessing the broadcast transmitter.

39. The broadcast content receiver as described in claim 38, wherein the broadcast content receiver utilizes the stored usage data to access the broadcast transmitter indicated by the storage usage data when the broadcast content receiver is at least one of generally located at the location indicated by the stored usage data and able to access the broadcast transmitter as indicated by location data.

40. The broadcast content receiver as described in claim 35, wherein the broadcast database further includes content characteristic data of content broadcast by a broadcast transmitter.

41. The broadcast content receiver as described in claim 35, where in the content characteristic data includes at least one of content type, style and available item of content.

42. The broadcast content receiver as described in claim 35, wherein a preset is set based on the broadcast transmittal data, the preset suitable for enabling a broadcast content accessor to access a broadcast transmitter based upon the broadcast content access data.

43. A broadcast content receiver suitable for receiving broadcast content based upon position, comprising:

means for determining a position, the position determining means suitable for determining position of the broadcast content receiver;

means for accessing broadcast content, the broadcast content accessing means suitable for accessing content from a broadcast transmitter;

wherein a broadcast database is queried, the broadcast database including broadcast transmittal data including broadcast content access data suitable for enabling the broadcast content accessing means to access a broadcast transmitter and broadcast location data suitable for determining location accessibility of broadcast content from a broadcast transmitter; and wherein the broadcast database is accessible to the processor by at least one of stored locally and accessible over a network.

44. The broadcast content receiver as described in claim 43, wherein the network includes a wireless network.

* * * * *